United States Patent
Van Der Horst et al.

(10) Patent No.: US 9,156,990 B2
(45) Date of Patent: Oct. 13, 2015

(54) FILLER FOR PAPERMAKING PROCESS

(75) Inventors: Peter Marten Van Der Horst, Arnhem (NL); Erik Sanne, Göteborg (SE); Kjell Rune Andersson, Göteborg (SE); Cherryleen Garcia-Lindgren, Domsjö (SE); Marie-Louise Wallberg, Domsjö (SE); Sune Wännström, Domsjö (SE)

(73) Assignee: EKA CHEMICALS AB, Bohus (SE)

( * ) Notice: Subject to any disclaimer, the term of this patent is extended or adjusted under 35 U.S.C. 154(b) by 1444 days.

(21) Appl. No.: 11/018,915

(22) Filed: Dec. 21, 2004

(65) Prior Publication Data

US 2005/0155520 A1 Jul. 21, 2005

Related U.S. Application Data

(60) Provisional application No. 60/532,267, filed on Dec. 22, 2003.

(51) Int. Cl.
*C09C 1/02* (2006.01)
*D21H 17/69* (2006.01)
*D21H 17/26* (2006.01)
*D21H 17/67* (2006.01)

(52) U.S. Cl.
CPC .............. *C09C 1/021* (2013.01); *D21H 17/69* (2013.01); *C01P 2004/10* (2013.01); *C01P 2006/12* (2013.01); *D21H 17/26* (2013.01); *D21H 17/675* (2013.01)

(58) Field of Classification Search
CPC . C01P 2004/10; C01P 2006/12; C09C 1/021; D21H 17/26; D21H 17/675; D21H 17/69
USPC ............... 106/204.01, 204.1, 157.6
See application file for complete search history.

(56) References Cited

U.S. PATENT DOCUMENTS

| | | | |
|---|---|---|---|
| 2,572,932 A | 10/1951 | Horsey et al. | 92/21 |
| 3,205,085 A | 9/1965 | Bailin | 106/300 |
| 3,730,830 A | 5/1973 | Driscoll | 162/146 |
| 4,196,008 A | 4/1980 | Kennedy-Skipton | 106/115 |
| 4,310,360 A | 1/1982 | Kvant | 106/306 |
| 4,335,184 A * | 6/1982 | Miyamoto et al. | 428/342 |
| 4,522,686 A | 6/1985 | Dumas | 162/158 |
| 4,710,270 A | 12/1987 | Sundén et al. | 162/175 |
| 4,925,530 A | 5/1990 | Sinclair et al. | 162/164.1 |
| 5,492,560 A | 2/1996 | Fairchild | 106/204.01 |
| 5,514,212 A | 5/1996 | Kurrle | 106/465 |
| 5,731,080 A | 3/1998 | Cousin et al. | 428/372 |
| 5,824,364 A | 10/1998 | Cousin et al. | 427/212 |
| 5,830,364 A * | 11/1998 | Bleakley | 210/712 |
| 5,972,100 A | 10/1999 | Dumas | 106/501.1 |
| 6,080,277 A * | 6/2000 | Oberkofler et al. | 162/157.6 |
| 6,251,222 B1 | 6/2001 | Silenius et al. | 162/9 |
| 6,375,794 B2 | 4/2002 | Silenius et al. | 162/9 |
| 6,599,391 B2 | 7/2003 | Silenius et al. | 162/9 |
| 6,602,994 B1 * | 8/2003 | Cash et al. | 536/30 |
| 2003/0109617 A1 * | 6/2003 | Niinikoski et al. | 524/425 |
| 2003/0188738 A1 | 10/2003 | Laleg | 127/32 |
| 2003/0208062 A1 * | 11/2003 | Cimecioglu et al. | 536/56 |

FOREIGN PATENT DOCUMENTS

| | | | | |
|---|---|---|---|---|
| EP | 0 261 820 B1 | 3/1988 | | D21H 17/69 |
| EP | 0 758 695 B1 | 2/1997 | | D21H 17/67 |
| GB | 1024352 | 3/1966 | | |
| GB | 1 347 071 | 2/1974 | | C09C 3/00 |
| GB | 1 400 410 | 7/1975 | | C09C 3/04 |
| GB | 2 016 498 A | 9/1979 | | C08L 3/00 |
| WO | WO 95/13324 A1 | 5/1995 | | C09C 3/10 |
| WO | WO 00/32702 A1 | 6/2000 | | C09C 3/10 |
| WO | WO02/086238 | * 10/2002 | | D21H 17/69 |
| WO | WO 02/086238 A1 | 10/2002 | | D21H 17/69 |

* cited by examiner

*Primary Examiner* — Shuangyi Abu Ali
(74) *Attorney, Agent, or Firm* — Alice C. Su

(57) ABSTRACT

The present invention relates to a filler comprising calcium salt and cellulose derivative having a degree of substitution of net ionic groups up to about 0.65, wherein the filler is substantially free from fibers or fibrils of cellulose or lignocellulose. The invention also relates to a filler comprising calcium salt and a cellulose derivative having a degree of substitution of net ionic groups up to about 0.65, wherein the cellulose derivative contains cationic groups.

38 Claims, No Drawings

FILLER FOR PAPERMAKING PROCESS

This application claims priority of U.S. Provisional Patent Application No. 60/532,267, filed Dec. 22, 2003.

The present invention relates to a filler comprising calcium salt and cellulose derivative. The invention further relates to a method of making the filler, the use of the filler in papermaking, a process for papermaking in which the filler is used as an additive as well as paper comprising the filler.

BACKGROUND OF THE INVENTION

Highly filled paper is an established trend in the paper industry not only due to the savings in the decreased use of fiber, but also due to improved product quality, such as higher opacity and better printability. Calcium carbonate-based fillers are commonly used, because of their superior light scattering properties. A major drawback in the production of highly filled paper, particularly with fillers having high surface area, is the high consumption of sizing agent. Thus, as the content of filler in the paper increases, a larger amount of sizing agent is required in order to obtain corresponding sizing results. Hence, cellulosic suspensions are more difficult to size when the amount of filler increases.

Sizing is primarily performed in order to achieve water repellence in paper or board and reduce edge wicking. It will also affect mechanical properties of paper and board, such as dimensional stability, friction coefficient, pliability and folding endurance. Additionally, sizing may improve printability specifically by controlling ink spreading and adhesion.

The sizing process involves the deposition of hydrophobic substances, commonly referred to as sizing agents, on the fiber surface. Commonly employed sizing agents are non-cellulose-reactive sizing agents, e.g. rosin-based sizing agents, and cellulose-reactive sizing agents, e.g. alkyl ketene dimers ("AKD") and acid anhydrides such as alkenyl succinic anhydride ("ASA"). It is known, however, that cellulose-reactive sizing agents, i.e. AKD and ASA, undergo hydrolysis that competes with the desired reaction with the fibers. Moreover, sizing losses in the final product can occur due to size inversion or migration, size evaporation, mechanical wear of the product, etc.

Bartz and co-workers have observed that during increased fluidity of AKD wax, some AKD could penetrate and thereafter be trapped in the pore structure of the filler (Bartz, W.; Darroch, M. E.; Kurrle, F. L., "Alkyl ketene dimer sizing efficiency and reversion in calcium carbonate filled papers", Tappi Journal, Vol. 77, No. 12, 1994). This occurs particularly with the scalenohedral form of PCC, which has the porous rosette structure and high surface area. Voutilainen has shown that fillers with high surface area adsorb AKD even better than fibers (Voutilainen, P., "Competitive Adsorption of Alkyl Ketene Dimer on Pulp Fibers and CaCO3 Fillers", Proceedings from International Paper and Coating Chemistry Symposium, 1996). The presence of Al- and Si-oxides on the filler surface may additionally adsorb cationic starch contained in the AKD particles. It has also been proposed that a strong interaction, or perhaps even bonding, exists between AKD and calcium carbonate filler. These proposed mechanisms with the filler are naturally undesired, and efforts should be made to minimise these interaction.

To improve sizing efficiency, it is suggested in U.S. Pat. No. 5,514,212 that the surface of the pigment can be modified with an anionic starch-soap complex. Cooked starch from corn or potato is complexed with fatty acid salts and precipitated onto pigment surfaces when mixed with precipitated calcium slurry or papermaking furnish containing high levels of calcium ions.

U.S. Pat. No. 5,972,100 suggests a system consisting of a cellulose-reactive size (such as AKD), a cationic dispersing agent (such as cationic starch or polyamides) and a filler. Aside from improved sizing, the invention allows independent control of both filler loading and sizing separately.

Furthermore, WO 95/13324 refers to calcium carbonate treated with a cellulose derivative such as sodium carboxymethyl cellulose ("CMC") having a degree of substitution of 0.7. Said treated calcium carbonate is used as filler in alkaline papermaking suspensions whereby the brightness of the paper is increased.

U.S. Pat. No. 3,730,830 discloses a process for making paper, specifically photographic paper, comprising the use of synthetic polymer fibers. Prior to the addition of the synthetic fibers to the fiber suspension, inorganic pigment or carbon is added to a slurry containing carboxymethyl cellulose and the synthetic fibers thereby achieving uniform dispersion of the polymer fibers among the cellulose fibers in the paper stock.

There is still a need for a filler which provides an improved papermaking process and better properties of the paper produced. It would be desirable to provide a filler which renders possible production of highly filled paper showing excellent printing and mechanical properties. It would also be desirable to provide a filler which reduces the sizing demand and hereby results in improved sizing efficiency. It would also be desirable to provide a filler that is compatible with drainage and retention aids, and hereby leads to good drainage, retention and paper machine runnability, It would also be desirable to provide a simple and efficient process for producing a filler showing the above characteristics.

SUMMARY OF THE INVENTION

The present invention generally relates to a filler comprising calcium salt and cellulose derivative. The present invention further generally relates to a filler comprising calcium salt and carboxyalkyl cellulose derivative. The invention also generally relates to a method of making the filler by mixing a calcium salt-containing material with a cellulose derivative, the use of the filler as an additive in papermaking as well as paper comprising the filler. The invention further generally relates to a papermaking process in which the filler is introduced into an aqueous cellulosic suspension.

More specifically, the invention relates to a filler comprising calcium salt and cellulose derivative having a degree of substitution of net ionic groups up to about 0.65. The invention also relates to a filler comprising calcium salt and a cellulose derivative having a degree of substitution of carboxyalkyl groups up to about 0.65. The invention further relates to a method of producing a filler which comprises mixing a calcium salt-containing material with a cellulose derivative having a degree of substitution of net ionic groups up to about 0.65. The invention also relates to a method of producing a filler which comprises mixing a calcium salt-containing material with a cellulose derivative having a degree of substitution of carboxyalkyl groups up to about 0.65. The invention further relates to a filler obtainable by these methods. The invention further relates to a papermaking process which comprises providing an aqueous suspension containing cellulosic fibers, introducing into the suspension a filler comprising calcium salt and cellulose derivative having a degree of substitution of net ionic groups up to about 0.65, and dewatering the suspension to form a web or sheet of paper. The invention also relates to a papermaking process which comprises providing an aqueous suspension containing cellulosic fibers, introducing into the suspension a filler comprising calcium salt and cellulose derivative having a degree of substitution of carboxyalkyl groups up to about 0.65, and dewatering the suspension to form a web or sheet of paper. In the papermaking process, the filler can be introduced into the cellulosic suspension by adding the calcium salt and cellulose derivative together as a single composition.

DETAILED DESCRIPTION OF THE INVENTION

The present invention provides a new filler that is suitable for use in papermaking. It has surprisingly been found that the filler according to the invention makes it possible to reduce some of the problems associated with fillers commonly used in papermaking and incorporated in paper. More specifically, by employing the filler of this invention in papermaking processes it is possible to provide paper with excellent printing properties, e.g. high smoothness, high opacity and whiteness, improved mechanical properties, e.g. dry strength, tensile strength, Scott bond and bending stiffness, and improved sizing effect. Additional advantages shown by the present invention include good and/or improved dewatering and fines retention, which lead to benefits in terms of paper machine runnability.

When using the filler in conjunction with a sizing agent, it has been observed that the present invention makes it possible to reduce the sizing demand and, thus, generally improving sizing efficiency. The improved sizing efficiency is exhibited for different types of sizing agents, including non-cellulose and cellulose-reactive sizing agents, specifically cellulose-reactive sizing agents such as ketene dimers and acid anhydrides. In particular, the invention provides improved sizing efficiency and sizing stability of filled paper, especially with high filler loading and/or when fillers with high surface areas are used.

According to the present invention it has also been observed, unexpectedly, that the cellulose derivative can be mixed with and more effectively be adsorbed on or attached to the calcium salt-containing material during simple processing. The filler of the invention can be regarded as a modified filler, or cellulose derivative-treated filler.

According to the present invention it has been found that very good results can be obtained by adding the calcium salt-containing material and cellulose derivative to a cellulosic suspension together in a pre-mixed or pre-treated form. The pre-treatment of the calcium salt-containing material with the cellulose derivative provides a convenient way of separately processing only one component of the cellulosic suspension to produce a modified filler, which can be used instead of or partly replacing conventional filler. Without being bound by any theory, it is believed that the cellulose derivative is adsorbed to the calcium salt-containing material when mixing the components.

The filler according to the invention comprises a calcium salt and a cellulose derivative. Examples of suitable calcium salts include calcium carbonate, calcium sulphate and calcium oxalate, preferably calcium carbonate, and mixtures thereof. Calcium carbonate is the main constituent in limestone, marble, chalk and dolomite. Calcium carbonate can be obtained directly from the above mentioned naturally occurring species of stone and is then referred to as ground calcium carbonate ("GCC"). Calcium carbonate can also be synthetically produced, commonly referred to as precipitated calcium carbonate ("PCC"). The calcium carbonate is preferably obtained from calcium hydroxide and a material which produces carbonate ions in the aqueous phase, such as an alkali metal carbonate or carbon dioxide. Both GCC and PCC can be used in the present invention, preferably PCC, including any of the various crystalline forms or morphologies that exist, e.g. calcite of rhombohedral, prismatic, tabular, cuboid and scalenohedral forms and aragonite of acicular form. The PCC usually has a specific area of from about 2 to about 20 $m^2/g$, suitably from about 7 to about 12 $m^2/g$.

The calcium salt can be present as essentially pure calcium salt, including mixtures of one or more calcium salts. It can also be present in the form of a mixture together with one or more other components. The term "calcium salt-containing material", as used herein, refers to a material comprising calcium salt, and optionally one or more other components. Examples of suitable other components of this type include fibers or fibrils of cellulose, lignocellulose or similar vegetable materials, inorganic clays, kaolin, talc, titanium dioxide, hydrogenated aluminium oxides, barium sulphate, etc. Preferably, when used, the other components are suited for use in papermaking.

In calcium salt-containing materials comprising fibers or fibrils of cellulose, lignocellulose or similar vegetable materials, at least part of the calcium salt can be deposited on the fibers or fibrils. The average thickness of the fibrils can be from about 0.01 up to about 10 μm, suitably up to about 5 μm and preferably up to about 1 μm. The average length of the fibrils can be from about 10 μm up to about 1500 μm. Examples of suitable calcium salt-containing materials include the composite materials disclosed in U.S. Pat. Nos. 5,731,080; 5,824,364; 6,251,222; 6,375,794; and 6,599,391, the disclosures of which are hereby incorporated herein by reference. Commercially available composite materials of this type include SuperFill® of M-Real Oy.

The filler according to the invention further comprises a cellulose derivative. It is preferred that the cellulose derivative is water-soluble or at least partly water-soluble or water-dispersible, preferably water-soluble or at least partly water-soluble. Preferably, the cellulose derivative is ionic. The cellulose derivative can be anionic, cationic or amphoteric, preferably anionic or amphoteric. Examples of suitable cellulose derivatives include cellulose ethers, e.g. anionic and amphoteric cellulose ethers, preferably anionic cellulose ethers. The cellulose derivative preferably has ionic or charged groups, or substituents. Examples of suitable ionic groups include anionic and cationic groups. Examples of suitable anionic groups include carboxylate, e.g. carboxyalkyl, sulphonate, e.g. sulphoalkyl, phosphate and phosphonate groups in which the alkyl group can be methyl, ethyl propyl and mixtures thereof, suitably methyl; suitably the cellulose derivative contains an anionic group comprising a carboxylate group, e.g. a carboxyalkyl group. The counterion of the anionic group is usually an alkali metal or alkaline earth metal, suitably sodium.

Examples of suitable cationic groups of cellulose derivatives according to the invention include salts of amines, suitably salts of tertiary amines, and quaternary ammonium groups, preferably quaternary ammonium groups. The substituents attached to the nitrogen atom of amines and quaternary ammonium groups can be same or different and can be selected from alkyl, cycloalkyl, and alkoxyalkyl, groups, and one, two or more of the substituents together with the nitrogen atom can form a heterocyclic ring. The substituents independently of each other usually comprise from 1 to about 24 carbon atoms, preferably from 1 to about 8 carbon atoms. The nitrogen of the cationic group can be attached to the cellulose or derivative thereof by means of a chain of atoms which suitably comprises carbon and hydrogen atoms, and optionally O and/or N atoms. Usually the chain of atoms is an alkylene group with from 2 to 18 and suitably 2 to 8 carbon atoms, optionally interrupted or substituted by one or more heteroatoms, e.g. O or N such as alkyleneoxy group or hydroxy propylene group. Preferred cellulose derivatives containing cationic groups include those obtained by reacting cellulose or derivative thereof with a quaternization agent selected from 2, 3-epoxypropyl trimethyl ammonium chloride, 3-chloro-2-hydroxypropyl trimethyl ammonium chloride and mixtures thereof.

The cellulose derivatives of this invention can contain non-ionic groups such as alkyl or hydroxy alkyl groups, e.g. hydroxymethyl, hydroxyethyl, hydroxypropyl, hydroxybutyl and mixtures thereof, e.g. hydroxyethyl methyl, hydroxypropyl methyl, hydroxybutyl methyl, hydroxyethyl ethyl, hydroxypropoyl and the like. In a preferred embodiment of the invention, the cellulose derivative contains both ionic groups and non-ionic groups.

Examples of suitable cellulose derivatives according to the invention include carboxyalkyl celluloses, e.g. carboxymethyl cellulose, carboxyethyl cellulose, carboxypropyl cellulose, sulphoethyl carboxymethyl cellulose, carboxymethyl hydroxyethyl cellulose ("CM-HEC"), carboxymethyl cellulose wherein the cellulose is substituted with one or more non-ionic substituents, preferably carboxymethyl cellulose ("CMC"). Examples of suitable cellulose derivatives and methods for their preparation include those disclosed in U.S. Pat. No. 4,940,785, which is hereby incorporated herein by reference.

According to a preferred embodiment of the invention the filler comprises a calcium salt containing fibers or fibrils of cellulose or lignocellulose and a cellulosic derivative containing cationic groups. The cationic groups can be any one of those listed in this application.

In another preferred embodiment of the invention the filler comprises a calcium salt which is substantially free from fibers or fibrils of cellulose or lignocellulose and a cellulosic derivative which can be either anionic, cationic or amphoteric.

The terms "degree of substitution" or "DS", as used herein, mean the number of substituted ring sites of the beta-anhydroglucose rings of the cellulose derivative. Since there are three hydroxyl groups on each anhydroglucose ring of the cellulose that are available for substitution, the maximum value of DS is 3.0. According to one preferred embodiment of the invention, the cellulose derivative has a degree of substitution of net ionic groups ("$DS_{NI}$") up to about 0.65, i.e. the cellulose derivative has an average degree of net ionic substitution per glucose unit up to about 0.65. The net ionic substitution can be net anionic, net cationic or net neutral. When the net ionic substitution is net anionic, there is a net excess of anionic groups (net anionic groups=the average number of anionic groups minus the average number of cationic groups, if any, per glucose unit) and $DS_{NI}$ is the same as the degree of substitution of net anionic groups ("$DS_{NA}$"). When the net ionic substitution is net cationic, there is a net excess of cationic groups (net cationic groups=the average number of cationic groups minus the average number of anionic groups, if any, per glucose unit) and $DS_{NI}$ is the same as the degree of substitution of net cationic groups ("$DS_{NC}$"). When the net ionic substitution is net neutral, the average number of anionic and cationic groups, if any, per glucose unit is the same, and $DS_{NI}$ as well as $DS_{NA}$ and $DS_{NC}$ are 0. According to another preferred embodiment of the invention, the cellulose derivative has a degree of substitution of carboxyalkyl groups ("$DS_{CA}$") up to about 0.65, i.e. the cellulose derivative has an average degree of carboxyalkyl substitution per glucose unit up to about 0.65. The carboxyalkyl groups are suitably carboxymethyl groups and then $DS_{CA}$ referred to herein is the same as the degree of substitution of carboxymethyl groups ("$DS_{CM}$"). According to these embodiments of the invention, $DS_{NI}$, $DS_{NA}$, $DS_{NC}$ and $DS_{CA}$ independently of each other are usually up to about 0.60, suitably up to about 0.50, preferably up to about 0.45 and more preferably up to 0.40, whereas $DS_{NI}$, $DS_{NA}$, $DS_{NC}$ and $DS_{CA}$ independently of each other are usually at least 0.01, suitably at least about 0.05, preferably at least about 0.10 and more preferably at least about 0.15. The ranges of $DS_{NI}$, $DS_{NA}$, $DS_{NC}$ and $DS_{CA}$ independently of each other are usually from about 0.01 to about 0.60, suitably from about 0.05 to about 0.50, preferably from about 0.10 to about 0.45 and more preferably from about 0.15 to about 0.40.

Cellulose derivatives that are anionic or amphoteric usually have a degree of anionic substitution ("$DS_A$") in the range of from 0.01 to about 1.0 as long as $DS_{NI}$ and $DS_{NA}$ are as defined herein; suitably from about 0.05, preferably from about 0.10, and more preferably from about 0.15 and suitably up to about 0.75, preferably up to about 0.5, and more preferably up to about 0.4. Cellulose derivatives that are cationic or amphoteric can have a degree of cationic substitution ("$DS_C$") in the range of from 0.01 to about 1.0 as long as $DS_{NI}$ and $DS_{NC}$ are as defined herein; suitably from about 0.02, preferably from about 0.03, and more preferably from about 0.05 and suitably up to about 0.75, preferably up to about 0.5, and more preferably up to about 0.4. The cationic groups are suitably quaternary ammonium groups and then $DS_C$ referred to herein is the same as the degree of substitution of quaternary ammonium groups ("$DS_{QN}$"). For amphoteric cellulose derivatives of this invention $DS_A$ or $DS_C$ can of course be higher than 0.65 as long as $DS_{NA}$ and $DS_{NC}$, respectively, are as defined herein. For example, if $DS_A$ is 0.75 and $DS_C$ is 0.15, then $DS_{NA}$ is 0.60.

Examples of suitable cellulose derivatives having degrees of substitution as defined above include the water-soluble low DS carboxyalkyl cellulose derivatives disclosed in co-pending patent applications filed in the name of Akzo Nobel N.V. of even date. The water-soluble cellulose derivatives suitably has a solubility of at least 85% by weight, based on total weight of dry cellulose derivative, in an aqueous solution, preferably at least 90% by weight, more preferably at least 95% by weight, and most preferably at least 98% by weight.

The cellulose derivative usually has an average molecular weight which is at least 20,000 Dalton, preferably at least 50,000 Dalton, and the average molecular weight is usually up to 1,000,000 Dalton, preferably up to 500,000 Dalton.

Preferably, in the filler according to the invention, the cellulose derivative is at least in part adsorbed on or attached to the calcium salt or other components present in the calcium salt-containing material. Suitably, at least about 10% by weight, preferably at least about 30% by weight, more preferably at least about 45% by weight and most preferably at least about 60% by weight of the cellulose derivate is adsorbed on or attached to the calcium salt or other components present in the calcium salt-containing material.

The filler according to the invention usually has a calcium salt content of at least 0.0001% by weight; the calcium salt content can be from about 0.0001 to about 99.5% by weight, suitably from about 0.1 to about 90% by weight, and preferably from about 60 to about 80% by weight, based on the weight of the solids of the filler, i.e. based on the dry weight of the filler. The filler usually has a cellulose derivative content of at least 0.01% by weight; the cellulose derivative content can be from about 0.01 to about 30% by weight, suitably from about 0.1 to about 20% by weight, and preferably from about 0.3 to about 10% by weight, based on the weight of the solids of the filler.

The filler according to the invention can be supplied as a solid material that can be essentially free of water. It can also be supplied as an aqueous composition. The content of aqueous phase, or water, can vary within wide limits, depending on the method of production and intended use.

The present invention also relates to a method of making a filler which comprises mixing a cellulose derivative, e.g. any one of the cellulose derivatives defined herein, with a calcium salt-containing material, e.g. any one of the calcium salt-containing materials defined herein, which comprises calcium salt, and optionally one or more other components. The cellulose derivative and calcium salt-containing material are suitably used in amounts so as to provide a filler according to the invention having contents of cellulose derivative and calcium salt as defined herein.

The cellulose derivative and calcium salt-containing material used can be present as solids or in aqueous compositions, and mixtures thereof. The calcium salt-containing material is suitably present as a finely divided material. The mixing can be achieved by adding the cellulose derivative to the filler, or vice versa, in a batch, semi-batch or continuous process. According to a preferred embodiment of the invention, the cellulose derivative is added as a solid to an aqueous composition of the calcium salt-containing material and the composition obtained is then suitably subjected to effective dispersing to dissolve the cellulose derivative. Preferably, the mixing is carried out by first forming a neutral to alkaline aqueous phase, suitably an aqueous solution, of cellulose derivative which is then mixed with an aqueous composition of calcium salt-containing material. Prior to mixing with the calcium salt-containing material, the aqueous phase of cellulose derivative can be subjected to pre-treatment, e.g. homogenisation, centrifugation and/or filtration, for example for separating undissolved cellulose derivative, if any, from the aqueous phase.

Preferably, the cellulose derivative is mixed with the calcium salt-containing material to allow at least part of the cellulose derivative to adsorb on or attach to the calcium salt-containing material, preferably so that it is hardly removed from the material by dilution with water. This can be accomplished by carrying out mixing under a period of time that is sufficient long to allow the adsorption on attachment. Suitably the mixing time is at least about 1 min, preferably at least about 5 min, more preferably at least about 10 min and most preferably at least about 20 min. Mixing periods of even several hours (1-10 h) are possible if it is desired to reach a high degree of attachment. Suitably, at least about 10% by weight, preferably at least about 30% by weight, more preferably at least about 45% by weight and most preferably at least about 60% by weight of the cellulose derivate is transferred from the aqueous phase and adsorbed on or attached to the calcium salt or other components present in the calcium salt-containing material.

The pH of the aqueous phase of cellulose derivative is usually adjusted for sorption of the specific cellulose derivative used at a value from about 4 to about 13, preferably from about 6 to about 10, more preferably from about 7 to about 8.5. A suitable base or acid can be used for adjusting the pH. Examples of suitable bases include bicarbonates and carbonates of alkali metals and alkali metal hydroxides, suitably sodium bicarbonate, sodium carbonate and sodium hydroxide. Examples of suitable acids include mineral acids, organic acids and acid salts, suitably sulphuric acid and its acid salts, such as alum. In general, at a lower pH, i.e. a pH from about 4.0 to neutral, adsorption of the cellulose derivative is higher but solubility is decreased, whereas at higher pH the adsorption is reduced but solubility is increased.

The temperature is not critical; in operations in non-pressurized conditions the temperature is typically from about 10 to about 100° C., preferably from about 20 to about 80° C. However, higher temperatures are more favourable, suitably the temperature of the aqueous composition during mixing is from about 30 up to about 70° C., more preferably from about 40 up to about 60° C.

When using calcium salt-containing material also containing other components than calcium salt, e.g. fibers or fibrils of cellulose or lignocellulose, the mixing and attaching of cellulose derivative can be done simultaneously with precipitation of the calcium salt on the fibrils or fibers or after the precipitation. It is also possible to add the cellulose derivative before the precipitation. In that case the cellulose derivative is added either during beating or in a separate sorption after beating. The cellulose derivative can be adsorbed on or attached to the calcium salt-containing material or fiber or fibril surfaces and/or sorbed into the fibers or fibrils. Methods of adsorbing similar cellulose derivatives to similar filler materials are disclosed in U.S. Pat. Nos. 5,731,080; 5,824,364; 6,251,222; 6,375,794; and 6,599,391, the disclosures of which are incorporated herein by reference The filler obtained by the method of the invention can be used as such, for example in papermaking. If present as an aqueous composition, it can be used directly or it can be dried, if desired, for example to simplify shipping.

The present invention also relates to a process for the production of paper which comprises providing an aqueous suspension containing cellulosic fibers ("cellulosic suspension"), introducing into the cellulosic suspension a filler, e.g. any one of the fillers defined herein, and dewatering the cellulosic suspension to form a web or sheet of paper. Preferably, the filler is introduced into the cellulosic suspension by adding it as a single composition. Alternatively, the calcium salt, or calcium salt-containing material (e.g. any one of the calcium salt-containing materials defined herein), and cellulose derivative (e.g. any one of the cellulose derivatives defined herein) can be separately added to the cellulosic suspension and the filler is formed in situ in the cellulosic suspension.

In the process, other components may of course be introduced into the cellulosic suspension. Examples of such components include conventional fillers, optical brightening agents, sizing agents, drainage and retention aids, dry strength agents, wet strength agents, etc. Examples of suitable conventional fillers include kaolin, china clay, titanium dioxide, gypsum, talc, natural and synthetic calcium carbonates, e.g. chalk, ground marble and precipitated calcium carbonate, hydrogenated aluminum oxides (aluminum trihydroxides), calcium sulphate, barium sulphate, calcium oxalate, etc. When using the filler according to the invention together with conventional filler, the filler according to the invention can be present in an amount of at least 1% by weight, suitably at least 5% by weight, preferably at least 10% by weight, more preferable at least about 20% by weight, and suitably up to about 99% by weight, based on the dry weight of all fillers. Examples of suitable sizing agents include non-cellulose-reactive sizing agents, e.g. rosin-based sizing agents like rosin-based soaps, rosin-based emulsions/dispersions, and cellulose-reactive sizing agents, e.g. emulsions/dispersions of acid anhydrides like alkenyl succinic anhydrides (ASA), alkenyl and alkyl ketene dimers (AKD) and multimers. Examples of suitable drainage and retention aids include organic polymeric products, e.g. cationic, anionic and non-ionic polymers including cationic polyethylene imines, cationic, anionic and non-ionic polyacrylamides, cationic polyamines, cationic starch, and cationic guar; inorganic materials, e.g. aluminium compounds, anionic microparticulate materials like colloidal silica-based particles, clays of smectite type, e.g. bentoinite, montmorillonite; colloidal alumina, and combinations thereof. Examples of suitable combinations of drainage and retention aids include cationic polymers and anionic microparticulate materials, e.g. cationic starch and anionic colloidal silica-based particles, cationic polyacrylamide and anionic colloidal silica-based particles as well as cationic polyacrylamide and bentoinite or montmorillonite. Examples of suitable wet strength agents include polyamines and polyaminoamides. Paper containing filler according to the invention and cationic starch shows very good strength properties.

According to a preferred embodiment of the invention, at least one sizing agent is introduced into the cellulosic suspension to produce sized paper containing filler. Preferably, the sizing agents are cellulose-reactive sizing agents of the types mentioned herein. Suitable ketene dimers have the general formula (I) below, wherein $R^1$ and $R^2$ represent saturated or unsaturated hydrocarbon groups, usually saturated hydrocarbons, the hydrocarbon groups suitably having from 8 to 36 carbon atoms, usually being straight or branched chain alkyl groups having 12 to 20 carbon atoms, such as hexadecyl and octadecyl groups. The ketene dimers may be liquid at ambient temperature, i.e. at 25° C., suitably at 20° C. Commonly, acid anhydrides can be characterized by the general formula (II) below, wherein $R^3$ and $R^4$ can be identical or different and represent saturated or unsaturated hydrocarbon groups suitably containing from 8 to 30 carbon atoms, or $R^3$ and $R^4$ together with the —C—O—C— moiety can form a 5 to 6 membered ring, optionally being further substituted with hydrocarbon groups containing up to 30 carbon atoms. Examples of acid anhydrides which are used commercially include alkyl and alkenyl succinic anhydrides and particularly isooctadecenyl succinic anhydride.

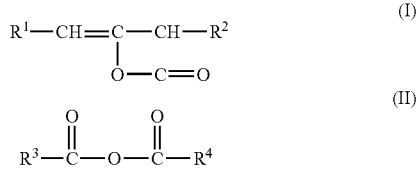

Suitable ketene dimers, acid anhydrides and organic isocyanates include the compounds disclosed in U.S. Pat. No. 4,522,686, which is hereby incorporated herein by reference.

The filler according to the invention can be added to the cellulosic suspension in amounts which can vary within wide limits depending on, inter alia, type of cellulosic suspension, type of paper produced, point of addition, etc. The filler is usually added in an amount within the range of from 1 to about 50% by weight, suitably from about 5 to about 40% by weight, and usually from about 10 to about 30% by weight, based on the weight of dry fibers. Accordingly, the paper according to the invention usually has a content of filler of this invention within the range of from 1 to about 50% by weight, suitably from about 5 to about 40% by weight, and usually from about 10 to about 30% by weight, based on the weight of dry fibers.

When using other components in the process, these components can be added to the cellulosic suspension in amounts which can vary within wide limits depending on, inter alia, type and number of components, type of cellulosic suspension, filler content, type of paper produced, point of addition, etc. Sizing agents are usually introduced into the cellulosic suspension in an amount of at least about 0.01% by weight, suitably at least about 0.1% by weight, based on the weight of dry fibers, and the upper limit is usually about 2% by weight, suitably about 0.5% by weight. Generally, drainage and retention aids are introduced into the cellulosic suspension in amounts that give better drainage and/or retention than what is obtained when not using these aids. Drainage and retention aids, dry strength agents and wet strength agents, independently of each other, are usually introduced in an amount of at least about 0.001% by weight, often at least about 0.005% by weight, based on dry fibers, and the upper limit is usually about 5% and suitably about 1.5% by weight.

The term "paper", as used herein, include not only paper and the production thereof, but also other cellulosic fiber-containing sheet or web-like products, such as for example board and paperboard, and the production thereof. The process can be used in the production of paper from different types of aqueous suspensions of cellulosic (cellulose-containing) fibers and the suspensions should suitably contain at least 25% by weight and preferably at least 50% by weight of such fibers, based on a dry substance. The cellulosic fibers can be based on virgin fibers and/or recycled fibers, including fibers of wood or annual or perennial plants. The cellulosic suspension can be wood-containing or wood-free, and it can be based on fibers from chemical pulp such as sulphate, sulphite and organosolve pulps, mechanical pulp such as thermo-mechanical pulp, chemo-thermo-mechanical pulp, refiner pulp and ground wood pulp, from both hardwood and softwood, and can also be based on recycled fibers, optionally from de-inked pulps, and mixtures thereof. The cellulosic suspension suitably has a pH in the neutral to alkaline range, e.g. from about 6 to about 10, preferably from about 6.5 to about 8.0.

The paper produced can be dried, coated and calendered. The paper can be coated with, for example, calcium carbonate, gypsum, aluminium silicate, kaolin, aluminium hydroxide, magnesium silicate, talc, titanium dioxide, barium sulphate, zinc oxide, synthetic pigment, and mixtures thereof.

The grammage of the paper produced can vary within wide limits depending on the type of paper produced; usually the grammage is within the range from about 20 to about 500 $g/m^2$, suitably from about 30 to about 450 $g/m^2$, and preferably from 30 to about 110 $g/m^2$. Preferably, the invention is used for the production of uncoated and coated offset paper, electrophotography paper, uncoated and coated fine paper, optionally containing mechanical pulp, as well as writing and printing papers. An especially preferred product is coated offset paper in which high gloss and high opacity and bulk are combined.

The invention is further illustrated in the following Examples which, however, are not intended to limit the same. Parts and % relate to parts by weight and % by weight, respectively, unless otherwise stated.

EXAMPLE 1

Fillers according to the invention and for comparison were prepared by treating calcium salt-containing material with cellulose derivatives. Cellulose derivatives used were carboxymethyl celluloses ("CMC") having $DS_{NI}$ ($DS_{CA}=DS_{CM}=DS_A=DS_{NA}=DS_{NI}$) of 0.3, 0.32 and 0.7, respectively. Another CMC used was quaternary ammonium carboxymethyl celluloses ("QN-CMC") having $DS_{CA}=DS_{CM}=DS_A=0.4$; $DS_C=DS_{QN}=0.17$; and $DS_{NI}=DS_{NA}=0.4-0.17=0.23$. The average molecular weights of the cellulose derivatives used were in the range of from 100,000 to 400,000. Calcium salt-containing materials used were different precipitated calcium carbonates ("PCC") having a surface area of 5.7 and 10.0 m$^2$/g, respectively. Another calcium salt-containing material used was SuperFill® (PCC on pulp fines).

The fillers were prepared by dissolving CMC into water to a consistency of 0.5% by weight. Thereafter, the obtained CMC composition was added to PCC filler slurry and mixed during 25 to 45 minutes at a temperature of about 50° C. The fillers according to the invention ("Invention Product") and for comparison ("Comparison Product") were the following:

| | |
|---|---|
| Invention Product 1 ("IP1"): | CMC (DS$_{NI}$ 0.3)-treated PCC (5.7 m$^2$/g) |
| Invention Product 2 ("IP2"): | CMC (DS$_{NI}$ 0.3)-treated PCC (10 m$^2$/g) |
| Invention Product 3 ("IP3"): | CMC (DS$_{NI}$ 0.32)-treated SuperFill ® |
| Invention Product 4 ("IP4"): | QN-CMC (DS$_{NI}$ 0.23)-treated SuperFill ®. |
| Comparison Product 1 ("CP1"): | CMC (DS$_{NI}$ 0.7)-treated PCC (5.7 m$^2$/g) |
| Comparison Product 2 ("CP2"): | SuperFill ®. |

EXAMPLE 2

Sizing of paper produced according to the invention was evaluated and compared to paper used for comparison purposes. Paper according to the invention was produced using IP1 according to Example 1. Paper used for comparison was produced using CP1 according to Example 1 and using filler containing no cellulose derivative.

Paper sheets were produced from pulp consisting of chemical pulp and containing untreated PCC in varying amounts (% by weight, based on dry paper), as indicated in Table 1. To the pulp suspension was added 2.0 kg/tonne dry fibers of filler according to Example 1 and filler containing no cellulose derivative; 3.0 kg/tonne dry fibers of AKD (aqueous dispersion Eka Keydime C223), and a retention system comprising cationic starch (Eka PL 1510) and silica particles (Eka NP 780). Both the cationic starch and silica particles were added in an amount of 0.15 kg/tonne dry fibers. The addition sequence was as follows:

| | |
|---|---|
| Addition of CMC-treated PCC: | 0 sec. |
| Addition of AKD dispersion: | 30 sec. |
| Addition of cationic starch: | 45 sec. |
| Addition of silica particles: | 60 sec. |
| Sheet formation: | 75 sec. |

The sheets were made according to a standard method using a Dynamical Sheet Former ("Formette", CTP Grenoble). The Cobb$_{60}$ (SCAN-P 12:64) method was used in order to establish the sizing results. Table 1 shows the results obtained.

TABLE 1

| Test No. | PCC Content of Paper | Filler | Cobb$_{60}$ |
|---|---|---|---|
| 1 | 18% | CP1 | 45 |
| 2 | 19% | IP1 | 25 |

EXAMPLE 3

In this Example, papermaking processes according to the invention were evaluated in which (i) CMC-treated PCC was added to the pulp suspension, and (ii) CMC and PCC (untreated) were separately added to the pulp suspension.

Paper sheets were produced from pulp of the same type used in Example 2 and containing 30% by weight, based on dry paper, of untreated PCC (surface area of 10 m$^2$/g) or CMC (DS$_{NI}$ 0.3)-treated PCC (10 m$^2$/g) (IP2 according to Example 1). To the pulp suspension was added 4 kg/tonne dry fiber of cationic starch (PB 970), 3.0 kg/tonne dry fibers of AKD (aqueous sizing dispersion Eka Keydime C223), and a retention system comprising cationic polyacrylamide (Eka PL 1310) and silica particles (Eka NP 780). Both the cationic polyacrylamide and silica particles were added in an amount of 0.20 kg/tonne dry paper. When untreated PCC was used, 1.0 kg/tonne of CMC having a DS$_{NI}$ of 0.3 was separately added. No separate addition of CMC was made when adding CMC-treated PCC. The addition sequence was as follows:

| | |
|---|---|
| Addition of cationic starch: | 0 sec. |
| Addition of CMC-treated PCC/untreated PCC: | 30 sec. |
| Separate addition of CMC: | 35 sec. |
| Addition of AKD: | 45 sec. |
| Addition of cationic polyacrylamide: | 60 sec. |
| Addition of silica particles: | 75 sec. |
| Sheet formation: | 90 sec. |

The paper sheets were evaluated as in Example 2. The results are shown in Table 2.

TABLE 2

| Test No. | Mode of Addition | Filler | Cobb$_{60}$ |
|---|---|---|---|
| 1 | Separately Added | Untreated PCC + CMC | 65 |
| 2 | CMC-treated PCC Added | IP2 | 35 |

EXAMPLE 4

Products of Example 1 were used and evaluated in papemaking processes. Paper sheets were manufactured from a fiber furnish containing 70% by weight of mixed hardwood pulp and 30% by weight of softwood pulp refined at 220 and 250 SR, respectively, in a method similar to Example 3 except that no cationic starch was used and use was made of untreated SuperFill ® filler (CP2) or CMC-treated SuperFill ® filler (IP3 and IP4), which was added in an amount so as to give a paper sheet containing 30% by weight of SuperFill ® filler. The addition sequence was as follows:

| | |
|---|---|
| Addition of SuperFill ® filler: | 0 sec. |
| Addition of cationic polyacrylamide: | 45 sec. |
| Addition of silica particles: | 75 sec. |
| Addition of AKD: | 90 sec. |

The results are set forth in Table 3.

TABLE 3

| Test No. | Filler | Cobb$_{60}$ |
|---|---|---|
| 1 | CP2 | 80 |
| 2 | IP3 | 50 |
| 3 | IP4 | 21 |

The invention claimed is:
1. A filler comprising calcium salt and water-soluble cellulose derivative having a degree of substitution of net anionic groups up to about 0.40, wherein the filler is substantially free from fibers or fibrils of cellulose or lignocellulose, wherein at least about 30% by weight of the cellulose derivative is absorbed on or attached to the calcium salt.

2. The filler according to claim 1, wherein the degree of substitution is at least 0.05.

3. The filler according to claim 1, wherein the degree of substitution is from about 0.15 to about 0.40.

4. The filler according to claim 1 wherein the cellulose derivative is a cellulose ether.

5. The filler according to claim 1, wherein the cellulose derivative contains carboxymethyl groups.

6. The filler according to claim 1, wherein the cellulose derivative contains quaternary ammonium groups.

7. The filler according to claim 1, wherein the cellulose derivative is anionic.

8. The filler according to claim 1, wherein the cellulose derivative is amphoteric.

9. The filler according to claim 1, wherein the filler has a cellulose derivative content from 0.3% to 10% by weight, based on the weight of the solids of the filler.

10. The filler according to claim 1, wherein the filler has a calcium salt content from 60% to about 80% by weight, based on the weight of the solids of the filler.

11. The filler according to claim 1, wherein the calcium salt is calcium carbonate.

12. The filler according to claim 1, wherein the calcium salt is precipitated calcium carbonate.

13. A filler comprising calcium salt and water-soluble cellulose derivative having a degree of substitution of net anionic groups up to about 0.40, wherein the cellulose derivative contains quaternary ammonium groups, and wherein the filler is substantially free from fibers or fibrils of cellulose or lignocellulose.

14. The filler according to claim 13, wherein the degree of substitution is at least 0.05.

15. The filler according to claim 13, wherein the degree of substitution is from about 0.15 to about 0.40.

16. The filler according to claim 13, wherein the cellulose derivative is a cellulose ether.

17. The filler according to claim 13, wherein the cellulose derivative contains carboxymethyl groups.

18. The filler according to claim 13, wherein the cellulose derivative is amphoteric.

19. The filler according to claim 13, wherein the filler has a cellulose derivative content from 0.3% to 10% by weight, based on the weight of the solids of the filler.

20. The filler according to claim 13, wherein the filler has a calcium salt content from 60% to about 80% by weight, based on the weight of the solids of the filler.

21. The filler according to claim 13, wherein the calcium salt is calcium carbonate.

22. The filler according to claim 13, wherein the calcium salt is precipitated calcium carbonate.

23. The filler according to claim 1, wherein the degree of substitution is up to about 0.30.

24. The filler according to claim 3, wherein the degree of substitution is from about 0.15 to about 0.30.

25. The filler according to claim 13, wherein the degree of substitution is up to about 0.30.

26. The filler according to claim 1, wherein at least about 45% by weight of the cellulose derivative is absorbed on or attached to the calcium salt.

27. The filler according to claim 26, wherein at least about 60% by weight of the cellulose derivative is absorbed on or attached to the calcium salt.

28. The filler according to claim 13, wherein at least about 30% by weight of the cellulose derivative is absorbed on or attached to the calcium salt.

29. A filler comprising a calcium salt which is precipitated calcium carbonate and a water-soluble cellulose derivative which is carboxymethyl cellulose having a degree of substitution of carboxymethyl groups up to about 0.45.

30. The filler according to claim 29, wherein the degree of substitution is at least 0.05.

31. The filler according to claim 29, wherein the degree of substitution is from about 0.15 to about 0.40.

32. The filler according to claim 29, wherein the filler has a cellulose derivative content from 0.3% to 10% by weight, based on the weight of the solids of the filler.

33. The filler according to claim 29, wherein the filler has a calcium salt content from 60% to about 80% by weight, based on the weight of the solids of the filler.

34. The filler according to claim 29, wherein the precipitated calcium carbonate has a specific surface area of from about 2 to about 20 m$^2$/g.

35. The filler according to claim 34, wherein the precipitated calcium carbonate has a specific surface area of from about 7 to about 12 m$^2$/g.

36. The filler according to claim 29, wherein at least about 45% by weight of the cellulose derivative is absorbed on or attached to the calcium salt.

37. A filler comprising a calcium salt which is calcium carbonate and a water-soluble cellulose derivative having a degree of substitution of carboxyalkyl groups up to about 0.45, wherein the calcium salt is precipitated calcium carbonate having a specific surface area of from about 7 to about 12 m$^2$/g, and wherein the filler has a calcium salt content of at least 0.0001% by weight and a cellulose derivative content of at least 0.01% by weight, based on the weight of solids of the filler.

38. The filler of claim 37, wherein the precipitated calcium carbonate has a specific surface area of from about 7 to 10 m$^2$/g.

* * * * *